United States Patent
Ganley

(10) Patent No.: US 10,001,297 B1
(45) Date of Patent: Jun. 19, 2018

(54) FREE-HANGING PARABOLIC TROUGH REFLECTORS FOR SOLAR ENERGY CONVERSION SYSTEMS

(71) Applicant: James T Ganley, St. Paul, MO (US)

(72) Inventor: James T Ganley, St. Paul, MO (US)

(73) Assignee: James T Ganley, St. Paul, MO (US)

( * ) Notice: Subject to any disclaimer, the term of this patent is extended or adjusted under 35 U.S.C. 154(b) by 0 days. days.

(21) Appl. No.: 15/437,272

(22) Filed: Feb. 20, 2017

(51) Int. Cl.
| | |
|---|---|
| *H01L 31/052* | (2014.01) |
| *H02S 40/42* | (2014.01) |
| *H02S 40/22* | (2014.01) |
| *H01L 31/054* | (2014.01) |
| *H02S 20/32* | (2014.01) |
| *H02S 40/44* | (2014.01) |
| *F24J 2/00* | (2014.01) |
| *G02B 5/08* | (2006.01) |
| *G02B 7/18* | (2006.01) |
| *G02B 17/00* | (2006.01) |

(52) U.S. Cl.
CPC .................... *F24J 2/0007* (2013.01)

(58) Field of Classification Search
CPC ........ F24J 2/0007; G02B 5/08; G02B 5/0808; G02B 7/182; G02B 7/183; G02B 7/185; G02B 17/00; G02B 17/00678; G02B 17/0684; G02B 17/0689; H01L 31/0525; H01L 31/0543; H02S 20/32; H02S 40/44; H02S 40/22; H02S 40/425
USPC ........... 359/851–853, 871; 136/246; 126/694
See application file for complete search history.

(56) References Cited

U.S. PATENT DOCUMENTS

| | | | | |
|---|---|---|---|---|
| 3,058,394 A | * | 10/1962 | Edlin .................... | F24J 2/1047 116/20 |
| 4,159,629 A | | 7/1979 | Korr | |
| 4,191,164 A | * | 3/1980 | Kelly ........................ | F24J 2/06 126/683 |
| 4,237,864 A | * | 12/1980 | Kravitz .................. | F24J 2/1052 126/573 |
| 4,263,893 A | * | 4/1981 | Pavlak ..................... | F24J 2/145 126/570 |
| 4,487,196 A | * | 12/1984 | Murphy ................... | F24J 2/125 126/690 |

(Continued)

OTHER PUBLICATIONS

Murray Spiegel; Applied Differential Equations; Prentice Hall Incorporated, 1962; Englewood, New Jersey, US; pp. 105 through 108.

(Continued)

*Primary Examiner* — Frank Font

(57) ABSTRACT

A parabolic trough reflector assembly consists of (1) a free-hanging, flexible rectangular sheet that is highly reflective of solar radiation and (2) support hardware which critically supports the reflecting sheet at two opposing edges. Methods are disclosed for providing linear dimensions and edge slopes for the reflecting sheet that are consistent with a parabolic trough having specific predetermined dimensions and a predetermined focal length. Methods are disclosed for providing uniform loading for a reflecting sheet when it is critically supported as a free-hanging element. The methods involve tapering the thickness of a sheet, applying variable-thickness coatings to a sheet of uniform thickness, or fabricating discreet thickness variations into a sheet of otherwise uniform thickness.

7 Claims, 6 Drawing Sheets

(56) References Cited

U.S. PATENT DOCUMENTS

| | | | | |
|---|---|---|---|---|
| 5,796,368 | A * | 8/1998 | Arthur, III | H01Q 1/02 343/704 |
| 5,851,309 | A * | 12/1998 | Kousa | F24J 2/0444 126/578 |
| 7,553,035 | B2 | 6/2009 | Wright | |
| 9,905,718 | B2 * | 2/2018 | Wang | H01L 31/0543 |
| 9,941,436 | B2 * | 4/2018 | Citron | H01L 31/0547 |
| 2007/0186921 | A1 * | 8/2007 | Swanepoel | F24J 2/14 126/600 |
| 2009/0056698 | A1 * | 3/2009 | Johnson | F24J 2/1047 126/569 |
| 2009/0223510 | A1 * | 9/2009 | Larsen | F22B 1/006 126/694 |
| 2010/0058703 | A1 * | 3/2010 | Werner | F16C 13/04 52/645 |
| 2010/0101560 | A1 * | 4/2010 | Olsson | F24J 2/16 126/601 |
| 2010/0243019 | A1 * | 9/2010 | Larsson | F24J 2/1047 136/230 |
| 2011/0188138 | A1 * | 8/2011 | Boeman | G02B 5/10 359/853 |
| 2011/0220096 | A1 * | 9/2011 | Margankunte | F24J 2/07 126/684 |
| 2013/0314812 | A1 * | 11/2013 | Tharisayi | G02B 19/0042 359/853 |
| 2014/0041698 | A1 * | 2/2014 | Adler | B08B 1/008 134/56 R |
| 2015/0184895 | A1 * | 7/2015 | Shelef | F24J 2/461 134/99.1 |
| 2015/0318820 | A1 * | 11/2015 | Dobney | H02S 40/22 136/259 |

OTHER PUBLICATIONS

R. E. Johnson and F. L. Kiokemeister; Calculus with Analytic Geometry; Allyn and Bacon Incorporated, 1964; Boston, Massachusetts, US; pp. 238 and 239.

* cited by examiner

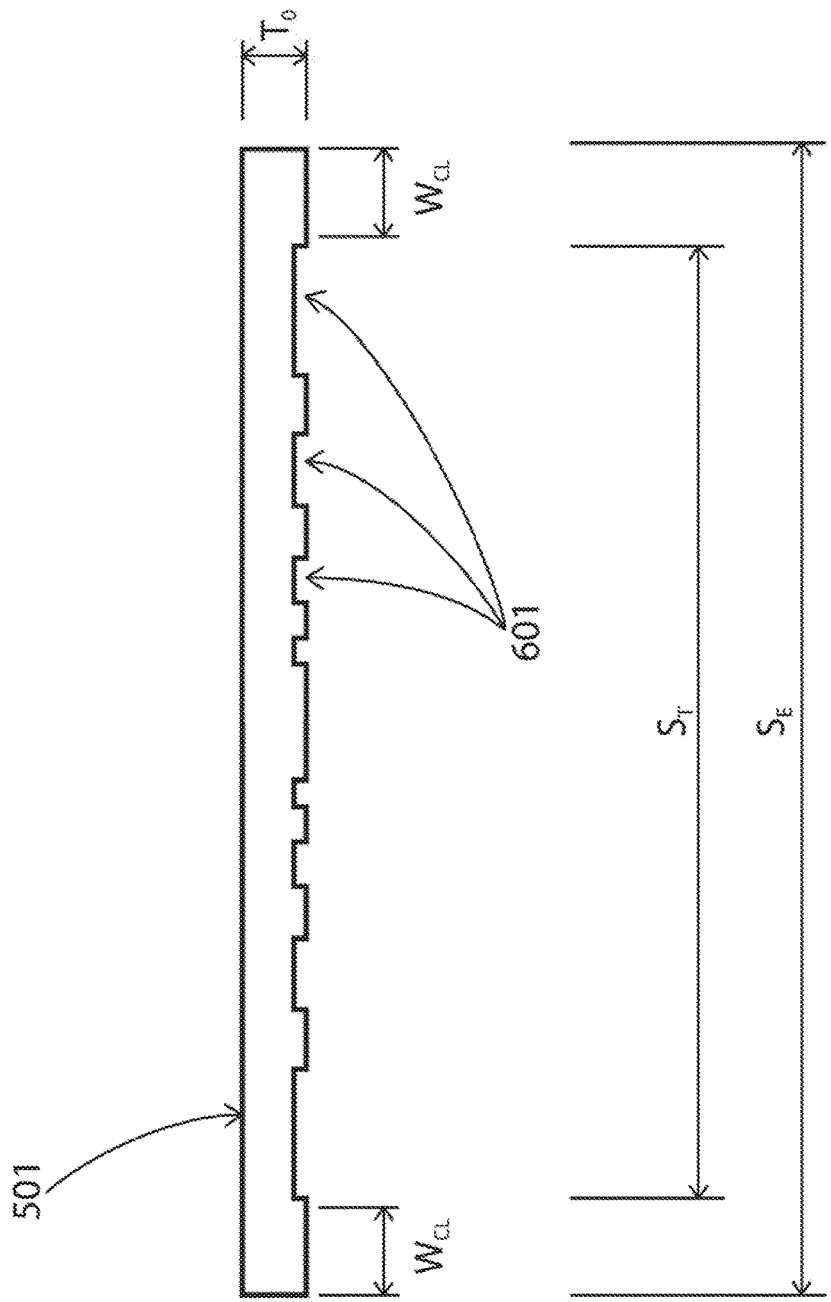

FREE-HANGING PARABOLIC TROUGH REFLECTORS FOR SOLAR ENERGY CONVERSION SYSTEMS

BACKGROUND OF THE INVENTION

This invention relates generally to parabolic trough reflectors and associated support structure; more specifically, this invention relates to flexible rectangular sheets that are supported along two opposing edges and thereby elastically deformed into parabolic troughs through the action of the distributed gravitational forces arising from their own weight.

Parabolic trough reflectors are used in solar energy conversion systems to collect and concentrate sunlight onto receiver elements. In order to accomplish this function, a parabolic trough reflector must track the sun; that is, it must pivot, roll, rotate, tilt, or otherwise move in some fashion so that its extended optical plane (plane containing its vertex line and its focal line) continuously bisects the solar disc as it moves across the sky.

There are two different kinds of solar energy conversion systems that use parabolic trough reflectors. Their distinguishing features relate primarily to the type of motion used to accomplish sun tracking.

One kind of system has parallel rows of parabolic trough reflectors whose longitudinal axes are permanently oriented in a fixed direction, usually in either a north-south direction or an east-west direction. In these systems, each reflector tilts (rolls) about an axis parallel to its focal line in order to track the sun. Systems of this kind are referred to herein as Tilting Trough Reflector (TTR) systems. TTR systems are by far the most common type of solar concentrating system currently in use, but they have three serious problems. The first problem with TTR systems is that, since the reflectors tilt in order to track the sun, the individual rows of reflectors must be separated in order to avoid mutual shadowing at low sun angles. This leads to poor land area utilization—which is less than 30% in many currently operating TTR systems. The second problem with TTR systems is that, during sun-tracking operations, the parabolic trough reflectors are subjected to directionally-varying forces and reflector support structures are exposed to severe bending and torsional stresses. Both the reflectors and the support hardware must be designed to function effectively in spite of these challenging mechanical requirements, and this significantly increases TTR system cost and decreases system reliability. The third problem with TTR systems is that, since the parabolic trough reflectors are permanently oriented in a fixed direction, they are exposed to severe wind-induced stresses whenever strong winds blow crosswise to the direction of their longitudinal axes. This places additional demands on both the reflectors and the support structure, again adding to hardware manufacturing costs and system complexity.

A second kind of parabolic trough reflector system avoids the inherent problems associated with TTR systems. U.S. Pat. No. 4,159,629 discloses a type of solar energy conversion system wherein the rows of parabolic trough reflectors do not have a fixed north-south or east-west orientation. For these systems, sun tracking is accomplished by rotating all the rows of reflectors and the associated rows of receiver elements as a single interconnected unit, with the rotation of the unit occurring in a horizontal plane about a central vertical axis. The individual reflectors do not tilt as they track the sun and the optical plane of each reflector is always held in a fixed vertical alignment. Since the reflectors do not tilt, they can be positioned side by side, thus providing efficient utilization of available land area. Also, the non-tilting parabolic trough reflectors provide directionally invariant loads to the reflectors and the reflector support hardware. This characteristic is very important because the design of the reflectors and the associated support structures can be greatly simplified—and their fabrication and installation costs can be significantly reduced. Finally, since the orientation of the rows of reflectors is not fixed in one specific direction, sun tracking for these systems may be temporarily interrupted whenever wind velocities reach a high level. The reflectors can then be reoriented so their longitudinal axes are aligned with wind direction. This feature greatly reduces the likelihood that wind-induced stresses could cause damage.

Solar energy conversion systems that use non-tilting parabolic trough reflectors will be referred to herein as Vertical Axis Trough Reflector (VATR) systems. (This designation is derived from the fact that sun tracking is accomplished by rotating the interconnected rows of trough reflectors about a central vertical axis.) Even though the VATR concept was originally proposed nearly 40 years ago, systems utilizing its obvious advantages have never been commercially deployed. This is primarily because much of the previously developed technology relating to parabolic trough reflectors cannot be effectively adapted to VATR systems.

The objective of this invention is to provide innovative designs for parabolic trough reflectors that can be used in VATR systems. The reflectors and support structures revealed herein can be fabricated by using simple manufacturing processes and the resulting hardware can be quickly and efficiently assembled in the field. These design/fabrication/assembly techniques will provide high-quality, low-cost parabolic trough reflectors and simple, dependable support structures. The reflectors and support structures will facilitate commercial deployment of solar energy conversion systems that make full use of the inherent advantages of the VATR concept.

BRIEF SUMMARY OF THE INVENTION

The present invention provides improvements of the parabolic trough reflector technology that is currently being used in concentrating solar energy conversion systems. The improvements relate to parabolic trough reflectors and support structures that can be fabricated by using simple manufacturing techniques and minimal quantities of materials.

The parabolic trough reflectors and support structures revealed herein will find application in VATR systems. During operation of a VATR system, the optical planes of the parabolic trough reflectors are always held in a fixed vertical alignment and the reflectors experience distributed gravitational forces that are invariant in both magnitude and direction. These operational conditions, which are uniquely associated with VATR systems, make it possible to design and fabricate mechanically-simple parabolic trough reflectors and support structures that are reliable, durable, and low in cost.

The parabolic trough reflectors revealed herein are created by securing and supporting flexible rectangular sheets along two opposing edges. When disposed in this manner, the sheets are elastically deformed (bent, bowed, curved) by distributed gravitational forces arising from their own weight. With properly aligned and properly positioned support fixtures, this elastic deformation causes the sheets to assume the form of a parabolic trough with specific, predetermined geometrical characteristics.

It is well known that a flexible cable supported at its ends will assume a specific geometrical shape which is determined by the nature and distribution of applied forces. The same is true for a flexible rectangular sheet supported along two opposing edges. The mathematical formulation used to predict the shape of a suspended element (cable, sheet, string, etc.) is independent of the cross-sectional characteristics of that element. A circular wire, an elliptical cable, a thin flat sheet—they are all mathematically equivalent elements if they are flexible. The assumptions made in deriving the geometrical shape assumed by a free-hanging (end or edge supported) flexible element relate only to the magnitude and direction of the forces acting on the element and the spatial distribution of those forces.

Of particular importance to this invention is the fact that a free-hanging flexible element that is uniformly loaded will assume a parabolic shape. In "Applied Differential Equations" by Murray Spiegel, Prentice Hall, 1962, on pages 105 to 108, a mathematical proof is given which shows that a free-hanging flexible cable has a parabolic shape while exposed to uniform loading. Even though the parabolic shape is derived there for a free-hanging flexible cable, the result, which is independent of the cross-sectional form of the free-hanging element, is also applicable to a free-hanging flexible rectangular sheet. A free-hanging flexible rectangular sheet has the shape of a parabolic trough while it is exposed to uniform loading.

This invention reveals parabolic trough reflectors that are created from flexible, highly reflective rectangular sheets which assume the shape of a parabolic trough when they are critically supported at two opposing edges and are uniformly loaded by their own distributed weight. A process is revealed herein which can be used to design and fabricate these flexible rectangular sheets and their associated support structures. The process consists of three complementary steps. Two of the steps involve making the rectangular sheets; one of the steps involves making, positioning, and aligning the support structure. These three steps can be used together to provide high-quality parabolic trough reflectors with desired predetermined values of longitudinal length, L, transverse width, W, and focal length, F.

The first step in the process of providing a free-hanging parabolic trough reflector that can be used in a VATR system involves fabricating a rectangular sheet with linear dimensions—as measured between opposing sets of parallel edges—that are consistent with a symmetric parabolic trough having desired predetermined values of L, W, and F. The rectangular sheet from which a parabolic trough reflector is formed must be fabricated so that the longitudinal dimension of the sheet is equal to the desired reflector length, L; the transverse dimension of the sheet—not including the part of the sheet used to secure its edges—must be made equal to the total parabolic arc length of a symmetric parabolic arc with width W and focal length F. The total parabolic arc length, represented herein by the symbol $S_T$, is the distance between points on opposing supported edges of a parabolic trough, with the distance between the points measured along the curved contour of the parabolic arc connecting them. The expression for $S_T$ is given by $$S_T = W(8F)^{-1}(16F^2 + W^2)^{1/2} + (2F)\log_e[(4F)^{-1}W + (4F)^{-1}(16F^2 + W^2)^{1/2}].$$

The notation "$\log_e$" is used herein to indicate the operation of taking the natural logarithm, in this case, the natural logarithm of the expression inside the square brackets. The length $S_T$ accounts only for the free-hanging part of the sheet, that is, the part of the sheet which is suspended between support fixtures at the sheet's edges. The extended parabolic arc length, represented by the notation $S_E$, refers to the total length of the transverse dimension of the sheet, which includes not only the free-hanging portion of the sheet, $S_T$, but also the sheet clamping width, $W_{CL}$. ($W_{CL}$ is the transverse width of that portion of the sheet, at each of its edges, which is used for clamping or otherwise securing the sheet at its edges.) The total transverse width of the sheet, $S_E$, is then given by $$S_E = S_T + 2W_{CL},$$

where $S_T$ is defined above. It should be noted that $S_T$, and therefore $S_E$, depend on the values of W and F. In fact, the geometric shape and all related geometric properties of a parabolic trough reflector are mathematically determined when W and F are chosen. Conversely, a flexible rectangular sheet with dimensions set in accordance with the above prescription will assume, when critically supported and loaded, the shape of a parabolic trough having the required values of L, W, and F.

The second step in the process of providing a free-hanging parabolic trough reflector that can be used in a VATR system involves fabricating, positioning, and orienting the support structures that secure and support the sheet at two of its edges. The two support fixtures securing the sheet (one along each supported edge of the sheet) must have a horizontal spacing that is equal to W, the specific, predetermined transverse width of the parabolic trough reflector which will be formed from the sheet. (The spacing, W, is measured horizontally between the supporting edges of the support fixtures.) Also, the support fixtures must be oriented and positioned so as to hold the two longitudinal (supported) edges of the free-hanging sheet parallel to each other and in the same horizontal plane. Additionally, the support fixtures must secure the edges of the free-hanging sheet so that the edge slopes are equal to the edge slopes of a previously designed parabolic trough reflector with desired predetermined values of W and F. (The edge slopes of a parabolic trough reflector are the slopes, relative to a horizontal plane, of the reflector surface along its two supported edges.) When W and F are chosen for a parabolic trough reflector, the edge slopes are mathematically determined and have a value of $W/4F$ along one edge and a value of $-W/4F$ along the other edge. When installed in a VATR system, the free-hanging rectangular sheet can be supported at its longitudinal edges by simple trusses. Each support truss (one along each of the two supported edges of the sheet) can be fabricated with a clamping fixture which holds the sheet so that its edge slopes have the values given above. If a sheet were perfectly flexible, the fixtures securing its edges would not affect the shape assumed by the sheet when it is supported as a free-hanging element. However, no real physical object is perfectly flexible. In the absence of support structure that properly establishes edge slopes, the slight inflexibility of a real sheet of plastic or metal would cause it to assume a shape that deviates from a true parabolic shape—a deviation which would affect the quality of the solar image produced by the reflector. Designing the support trusses so they clamp the edges of the sheet and fix its edge slopes to be $\pm W/4F$ assures that, when properly loaded, the sheet will assume a parabolic shape—with the required values of W and F—in spite of some degree of inflexibility.

The third step in the process of providing a free-hanging parabolic trough reflector that can be used in a VATR system involves creating a precisely defined mass distribution for the rectangular sheet from which the reflector is formed. With an appropriate mass distribution, uniform loading is provided for a sheet when it is supported at its edges as a free-hanging element. With uniform loading, a critically supported (discussed in the previous paragraph) free-hanging sheet assumes the shape of a parabolic trough. For a free-hanging sheet to be uniformly loaded when supported at its edges, and thereby assume the shape of a parabolic trough, the sheet's mass distribution (mass per unit of surface area) must be a maximum along its longitudinal centerline and then decrease gradually across the sheet's width to a slightly lower value at its supported edges. The required mass distribution for the sheet can be achieved by continuously tapering the thickness of the sheet from a maximum thickness value along its longitudinal centerline to a slightly thinner value along each supported edge. A second method for providing a mass distribution that produces uniform loading involves applying a coating of variable thickness to the back of the sheet. A third method for providing a mass distribution that produces uniform loading involves producing a stepped or discreetly varying mass distribution. The discreetly varying mass distribution can be created by machining or molding grooves of appropriate width, depth, and spacing into the back of the sheet. Because of the slight inflexibility of a real sheet of plastic or metal, this discontinuous loading can provide an effective mass distribution which produces the required continuous parabolic deformation of a free-hanging sheet. The mathematical formalism used to determine the details of these methods of providing uniform loading for a free-hanging sheet and parabolic deformation thereof, as well as the means for converting the mathematical formalisms to manufacturable dimensions, will be described in the detailed description of the invention.

In summary, the present invention reveals a three-step process for creating and supporting a rectangular sheet that can be formed—through the action of distributed gravitational forces arising from its own weight—into a parabolic trough reflector which can be used in a VATR system. The first step involves fabricating a rectangular sheet whose linear dimensions are consistent with a parabolic trough reflector with specific predetermined values of longitudinal length L, transverse width W, and focal length F. The second step involves providing support structure which will hold two opposing edges of the sheet parallel to each other and in the same horizontal plane, and also fix the sheet's edge slopes with values equal to ±W/4F. The third step involves providing a mass distribution for the sheet which will produce uniform loading of the sheet when it is critically supported as a free-hanging element. The required mass distribution of the sheet can be provided by tapering the thickness of the sheet, by applying a variable-thickness coating to the back of the sheet, or by machining or molding channels of appropriate width, depth, and spacing into the back of the sheet.

In addition to providing the above mentioned improvements and extensions of previously disclosed art as it pertains to parabolic trough reflectors, the present invention offers other important advances. The nature and extent of these advances will become more apparent after reviewing the drawings, the detailed description of the invention, and the attached claims.

BRIEF DESCRIPTION OF THE DRAWINGS

FIG. 6 shows a transverse section of a sheet with a discretely-varying transverse thickness profile.

DETAILED DESCRIPTION OF THE INVENTION

Figure 1:
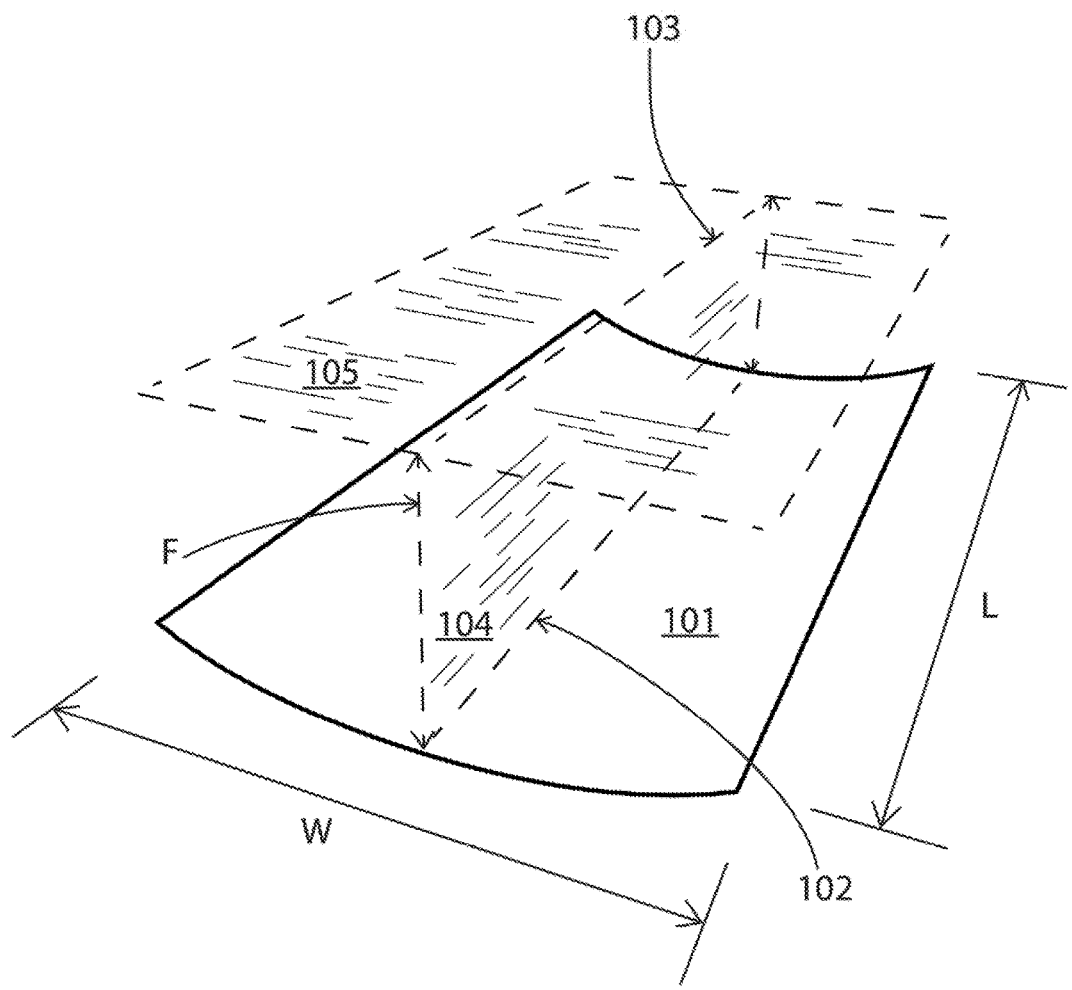
FIG. 1 is a line drawing of a parabolic trough reflector with identification of important parameters.

This specification uses terms that have a scientific or technical meaning that may differ from the meaning assumed in everyday usage. The following paragraphs define and explain various terms and concepts with regard to the meaning intended herein.

The word "sheet" is used herein to refer to a thin rectangular object whose length and width are much greater than its thickness. It is noted that, in this specification, the word "sheet" refers to objects with two identically-shaped rectangular faces, and further, a sheet is not necessarily of uniform thickness.

The word "trough" is used herein to designate a thin object with two linear edges that are parallel to each other and two curved edges that are parallel to each other, with the four edges together defining the boundary of an object with a curved front surface which is concave and a curved rear surface which is convex. It is noted that, for the purposes of this specification, a trough is said to have (1) a longitudinal axis which is parallel to its two linear edges and (2) a transverse axis which is perpendicular to its two linear edges. The term "parabolic trough" is used herein to designate a trough whose transverse sections (transverse planar cuts) are all identical parabolas, regardless of the longitudinal location of the sections. The term "parabolic trough reflector" is used herein to designate a parabolic trough whose concave (front) surface is highly reflective of solar radiation.

The term "free-hanging" is used herein to refer to a (rectangular) sheet supported only along two opposing edges or to a trough supported only along its two linear edges. The only forces acting on a free-hanging sheet or trough are the localized forces exerted by the edge-supporting hardware and the distributed gravitational forces arising from the weight of the sheet or trough.

In this specification, there are discussions of flexible sheets which become elastically deformed when they are supported along two opposing edges, and thereby assume the shape of a trough. In this sense, a free-hanging sheet is also a free-hanging trough and the word "sheet" is sometimes used herein to refer to objects that may be disposed either as planar sheets or as free-hanging troughs. In keeping with the above discussion, it is noted that the longitudinal axis of a free-hanging trough is parallel to its linear edges, which are also its supported edges, and the transverse axis of a free-hanging trough is perpendicular to its linear (supported) edges. Because of the overlap in terminology between free-hanging sheets and troughs, the longitudinal axis of a free-hanging sheet is taken to be the axis parallel to its supported edges and its transverse axis is perpendicular to its supported edges. The longitudinal and transverse axes of a free-hanging sheet are still identified as such even when the sheet is not supported at its edges and is thereby disposed in a planar geometry.

The word "profile" and the term "spatial profile" are used herein to denote the spatial variation of a physical property of a sheet or trough. Examples of physical properties whose profiles are discussed in this specification include thickness, mass per unit area, gravitational force per unit area, etc. The term "areal profile" denotes a spatial profile that exists across the surface—or a portion of the surface—of a sheet or trough. The term "sectional profile" denotes the spatial profile of a physical property along a longitudinal or transverse section (planar cut) of a sheet or trough.

For the purposes of this specification, it is stipulated that the supported edges of free-hanging sheets or free-hanging troughs are always held so they are parallel and in the same horizontal plane. In addition, it is stipulated that the physical characteristics of any free-hanging sheet or trough are such that the spatial profile of the distributed gravitational force acting along any transverse section of the sheet or trough is symmetric with respect to the longitudinal centerline located midway between the supported edges of said sheet or trough. Also, it is stipulated that the spatial profile of the distributed gravitational force acting along any transverse section of a free-hanging sheet or trough is identical for all transverse sections of the sheet or trough. With these stipulations, it is noted that any free-hanging sheet or trough has a vertical plane of symmetry located midway between its supported edges.

The term "critically supported" is used herein to refer to a particular method of supporting a free-hanging sheet or trough wherein the two supported edges of the sheet or trough (1) are parallel to each other and (2) are in the same horizontal plane and (3) are separated by a fixed horizontal distance that is equal to the specific predetermined values of the transverse width, W, of a previously conceived free-hanging trough and (4) are secured so that the sheet or trough has edge slopes (relative to the horizontal plane) that are consistent with the specific predetermined values of transverse width, W, and focal length, F, of the aforementioned free-hanging trough.

The term "mass distribution" is used herein to designate the areal (two-dimensional) profile of the ratio of a mass to an area. The mass used in forming the ratio is the mass of a full-thickness piece of a sheet or trough; the area used in forming the ratio is the planar surface area of one face of the full-thickness piece. The ratio is taken in the limit as the surface area of the piece becomes infinitesimally small. The areal profile of the mass distribution for a sheet or trough is defined at all points across the surface of the sheet or trough. In this application, it is stipulated that the mass distribution of any sheet or trough is symmetric with respect to the longitudinal centerline of said sheet of trough, and further, the mass distribution is the same at all points along any longitudinal section of said sheet or trough.

The word "loading" is used herein to refer to the gravitational force distribution across the areal extent of a free-hanging sheet or trough. The loading of a free-hanging sheet or trough is defined as the ratio of a force to an area. The force used in forming the ratio is the gravitational force exerted on a small, full-thickness piece of the free-hanging sheet or trough; the area used in forming the ratio is the vertically projected area of one surface of the full-thickness piece onto a horizontal plane. The ratio is taken in the limit as the surface area of the piece and the corresponding area of the horizontal-plane projection of the piece become infinitesimally small. The point-to-point variation (areal profile) of the loading of a free-hanging sheet or trough is determined by (1) the mass distribution across the surface area of the sheet or trough and by (2) the local curvature of the sheet or trough. Because of the stipulated symmetry of the gravitational force distribution, the loading of a free-hanging sheet or trough is symmetric with respect to the longitudinal centerline of the sheet or trough. Also, the spatial profiles of the loading along transverse sections of a free-hanging sheet or trough are identical for all transverse sections of said sheet or trough, or stated another way, the loading is the same at points that are equidistant from the centerline of said sheet or trough.

The term "uniform loading" is used herein to refer to loading of a free-hanging sheet or trough which is the same at all points across the surface of the sheet or trough. Since the loading of a free-hanging sheet or trough is produced by a gravitational force distribution, it is apparent that any desired loading—uniform loading in particular—can be achieved by providing an appropriate mass distribution profile for the sheet or trough.

The term "flexible" is used herein to describe a physical object which responds to transverse bending forces by undergoing elastic deformation that converts the bending forces into tensile stresses. A perfectly flexible element cannot support internal sheer stresses. In the following paragraphs, there are discussions of mathematical derivations which predict the shapes of free-hanging sheets or troughs. In these derivations, an a priori assumption is that the free-hanging elements are perfectly flexible. No real physical object is perfectly flexible, but the errors encountered in making the assumption of perfect flexibility are often negligible and the results of the mathematical predictions are of practical value. In this specification, the term "flexible" is sometimes used to describe real objects that are not perfectly flexible.

FIG. 1 shows a parabolic trough reflector 101 which, for the purposes of this specification, is defined as a parabolic trough characterized by a concave (front) surface that is highly reflective of solar radiation, a horizontally-measured longitudinal length, L, a horizontally-measured transverse width, W, and a focal length, F. All transverse sections (lateral planar cuts) of a parabolic trough reflector's surface produce identical parabolas which are referred to herein as cross-sectional parabolas. The lateral extent and the geometrical characteristics of the cross-sectional parabolas are completely determined by the choice of W and F, and since all the cross-sectional parabolas are identical, the size and the geometrical characteristics of the entire parabolic trough reflector surface are mathematically determined when L, W, and F are chosen. A parabolic trough reflector has a vertex line 102 which passes through the vertex points of its cross-sectional parabolas and it has a focal line 103 which passes through the focal points of its cross-sectional parabolas. The vertex line and the focal line are parallel and are separated by a distance F. The optical plane 104 of a parabolic trough reflector is the plane containing the reflector's vertex line 102 and its focal line, 103. The focal plane 105 of a parabolic trough reflector is the plane which contains the reflector's focal line 103 and is perpendicular to its optical plane 104. Because the parabolic trough reflectors discussed in this specification are symmetric, a reflector's optical plane is coincident with its longitudinal plane of symmetry. When parabolic trough reflectors are used in a VATR system, the optical plane of each reflector is always held in a fixed vertical alignment and the focal plane is therefore horizontal. Sun tracking for a VATR system is accomplished by rotating the entire system so that the extended optical plane of each parabolic trough reflector continuously bisects the solar disk as it moves across the sky.

Figure 2:
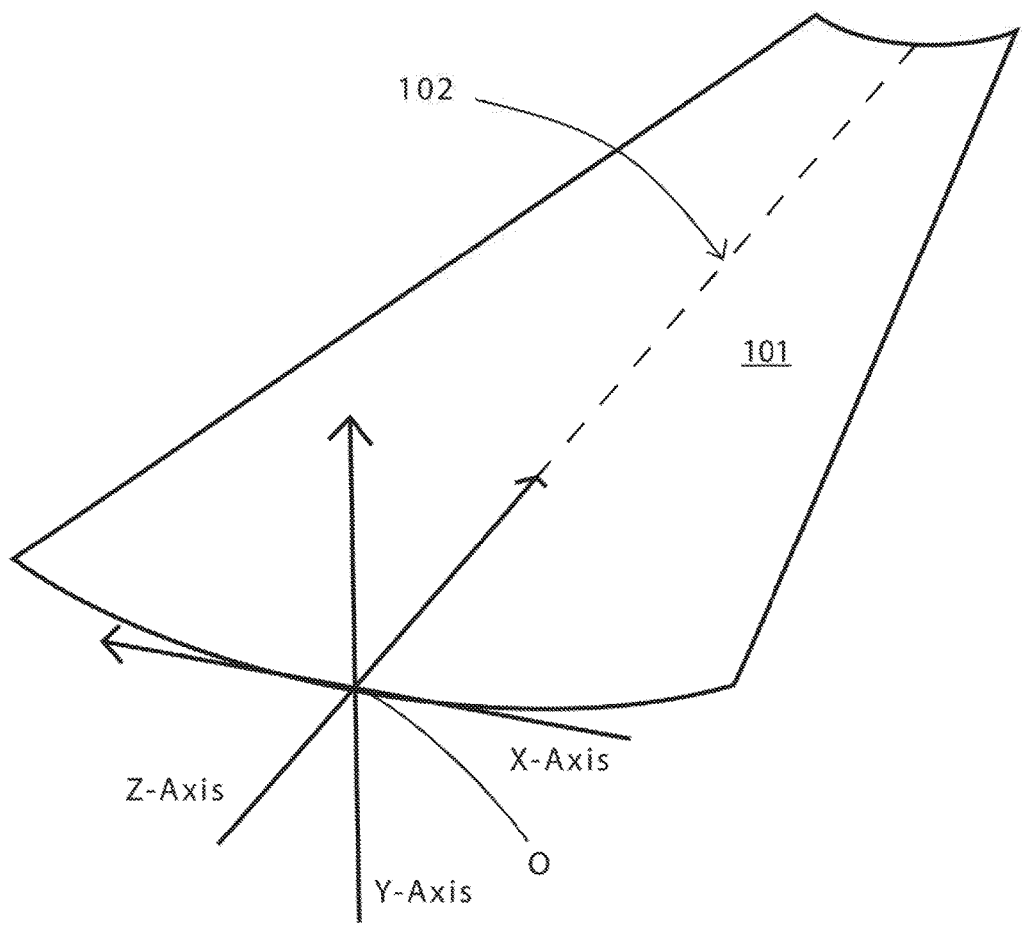
FIG. 2 shows a three-axis Cartesian coordinate system in relation to a parabolic trough reflector.

FIG. 2 shows parabolic trough reflector 101 with a superimposed three-axis Cartesian coordinate system which is used herein to mathematically describe the geometry of parabolic trough reflectors. The origin O of the coordinate system is on the vertex line of the reflector and located at one of its ends. The X-axis of the coordinate system, which is also a transverse axis of the reflector, passes through the origin O and is perpendicular to the reflector's optical plane. The Y-axis of the coordinate system passes through the origin O and is perpendicular to the reflector's focal plane. The Z-axis of the coordinate system, which is also a longitudinal axis of the reflector, is coincident with the reflector's vertex line, 102. The coordinate variables X, Y, and Z are used herein to designate location, relative to the origin O, on the X-axis, the Y-axis, and the Z-axis, respectively. The variables X and Z are considered to be independent variables defining the value of the dependent variable Y. However, for the purposes of this specification, the geometrical properties of a parabolic trough reflector's surface, as well as any functions describing spatial profiles of any physical properties (thickness, density, degree of flexibility, etc.) of a parabolic trough reflector, are stipulated as being independent of the value of the Z coordinate. Therefore, in this specification, any mathematical expression describing the physical or geometrical characteristics of free-hanging sheets or troughs is an expression which explicitly involves only one independent coordinate variable, and that is X. Mathematical expressions specified in terms of X are valid for any value of the coordinate variable Z.

With reference to the coordinate system of FIG. 2, it can be shown that the equation $$Y(X)=X^2/4F$$

defines the location of points (X, Y) on the surface of a parabolic trough reflector in terms of the transverse coordinate variable X and the reflector focal length F. This expression for Y(X) is valid for values of X that are in the range $-W/2 \leq X \leq W/2$ and values of Z that are in the range $0 \leq Z \leq L$. Methods of differential and integral calculus can be used with this expression for Y(X) to develop mathematical relationships defining the characteristics of a flexible sheet which takes on—when critically supported as a free-hanging element—the shape of a parabolic trough with desired predetermined values of longitudinal length L, transverse width W, and focal length F. The following concepts are important in developing these relationships: arc length, parabolic arc length, derivative of parabolic arc length, total parabolic arc length, extended arc length, and edge slope. These concepts are defined and discussed in the following paragraphs.

The term "arc length" is used herein to designate the distance between two points, with the distance between the points measured along the contours of a two-dimensional curved path connecting the points.

The term "parabolic arc length," represented by the notation S(X), is used herein to designate the arc length between two points on the surface of a parabolic trough reflector, with one of the points being the vertex of a cross sectional parabola and with the other point being the generalized point (X, Y) on the same cross-sectional parabola. The expression defining S(X) in terms of X and F is:

$$S(X)=|X|(4F)^{-1}(4F^2+X^2)^{1/2}+(F)\log_e[|X|(2F)^{-1}+(2F)^{-1}(4F^2+X^2)^{1/2}].$$

The notation "|X|" is used herein to designate the absolute value of the coordinate variable X. The notation "$\log_e$" is used herein to indicate the operation of taking the natural logarithm, in this case, the natural logarithm of the expression inside the square brackets.

The derivative of the arc length function S(X) with respect to the transverse coordinate variable X is represented herein by the notation S'(X). The expression defining S'(X) in terms of X and F is:

$$S'(X)=(2F)^{-1}(4F^2+X^2)^{1/2}$$

A general expression for the derivative of the arc length of any differentiable curve is derived in "Calculus with Analytic Geometry," edition 3, by R. E. Johnson and F. L. Kiokemeister, Allyn and Bacon Incorporated, 1964, pages 238 and 239. The above expression for S'(X) is found by adapting the general expression for the derivative of the arc length to the special case of a parabolic arc. The expression above defining S(X) is found by integration of the expression for S'(X) over the interval from zero to X.

The term "total parabolic arc length," represented herein by the notation $S_T$, is used herein to designate the arc length measured between two points that lie directly opposite each other on opposing supported edges of a symmetric parabolic trough reflector, that is, at the extremities of one of the reflector's cross-sectional parabolas. An expression for $S_T$ in terms of W and F is derived by evaluating the expression for S(X) at X=W/2 and then multiplying the result by 2. It is necessary to multiply by 2 because the arc length measured from the vertex to the edge of the reflector gives only half of the total parabolic arc length, $S_T$, which is measured from edge to edge. The expression for $S_T$ in terms of W and F is:

$$S_T=(W/8F)(16F^2+W^2)^{1/2}+(2F)\log_e[(W/4F)+(1/4F)(16F^2+W^2)^{1/2}]$$

The derivative of Y(X) with respect to X, which is represented herein by the notation Y'(X), gives the slope of a parabolic trough reflector's surface relative to the X-axis, which in this case lies in a horizontal plane. The expression for Y'(X), defined for the coordinate ranges given above, is:

$$Y'(X)=X/2F.$$

As mentioned previously, the term "edge slope" is used herein to designate the slope, relative to a horizontal plane, of a free-hanging sheet or a parabolic trough at a supported edge. Edge slopes of a free-hanging element are represented herein by the symbol $\sigma_e$ and, for a parabolic trough reflector, they are found by evaluating the expression for Y'(X) at X=±W/2:

$$\sigma_e=\pm W/4F.$$

When W and F are chosen for a parabolic trough reflector, the values of the edge slopes are uniquely determined.

This invention reveals parabolic trough reflectors that are formed from flexible, highly reflective rectangular sheets which assume the shape of a parabolic trough when they are critically supported as free-hanging elements and are uniformly loaded by their own distributed weight. When a flexible sheet is supported as a free-hanging element, a portion of the sheet along each edge must be clamped or held in some fashion in order to support and secure the sheet's edges. The term "clamping width," represented herein by the notation $W_{CL}$, is used herein to designate the transverse width of that portion of the sheet, at each of its supported edges, which is used for clamping or otherwise securing the sheet. The portion of the sheet which is used to clamp or otherwise secure the sheet's edges is not part of the reflecting surface.

Assembly and proper operation of a VATR system require that the system's parabolic trough reflectors be fabricated so as to be compatible with certain features of the overall system design. For any particular system, the parabolic trough reflectors must be fabricated so they have a specific value of longitudinal length, L, a specific value of transverse width, W, a specific value of focal length, F, and a specific value for the clamping widths, $W_{CL}$. The values of these four parameters are determined before the reflectors are fabricated as a result of various system design considerations. The reflectors must be fabricated with the desired values of these four parameters in order to ensure compatibility with the overall system design. The term "system-specific" is used herein to refer to the predetermined values of these four parameters. The sheets from which the parabolic trough reflectors are formed must be fabricated with physical characteristics (linear dimensions, thickness profiles, mass distribution profiles, etc.) that are compatible with formation, through the process of critically supporting said sheets as free-hanging elements, of parabolic trough reflectors with the desired system-specific values for these parameters.

A process is revealed herein which can be used to design and fabricate flexible rectangular sheets and associated support structures, with the sheets taking the form of parabolic trough reflectors when critically supported as free-hanging elements. The process for providing the parabolic trough reflectors consists of three complementary steps. Two of the steps involve making the rectangular sheets that are transformed into parabolic trough reflectors when critically supported; one of the steps involves making, positioning, and aligning the support hardware. These three steps can be used together to provide high-quality parabolic trough reflectors with desired predetermined (system-specific) values of longitudinal length, L, transverse width, W, focal length, F, and clamping width, $W_{CL}$.

The first step in the process of providing a free-hanging parabolic trough reflector that can be used in a VATR system involves fabricating a rectangular sheet with linear dimensions—as measured between opposing sets of parallel edges—that are consistent with a symmetric parabolic trough reflector having desired system-specific values of L, W, F and $W_{CL}$. The rectangular sheet from which a parabolic trough reflector is formed must be fabricated so that one linear dimension of the sheet, its longitudinal dimension, is equal to the reflector's desired longitudinal length, L; the other linear dimension of the sheet, its transverse dimension, must be made equal to the extended parabolic arc length of the parabolic trough reflector. The term "extended parabolic arc length," represented by the symbol $S_E$, is used herein to designate a distance that is equal to the sum of the total parabolic arc length, $S_T$, and twice the sheet clamping width, $W_{CL}$. In accordance with the above definitions, the transverse dimension of the sheet, $S_E$, is defined by the relationship $$S_E = S_T + 2W_{CL}.$$

It should be noted that $S_T$, and therefore $S_E$, depend on the values of W and F. In fact, all geometric properties of a parabolic trough reflector are mathematically determined when W and F are chosen. Conversely, a flexible rectangular sheet with dimensions set in accordance with the above prescription will assume the shape of a parabolic trough having the required values of L, W, and F when it is critically supported and properly loaded.

Figure 3A:
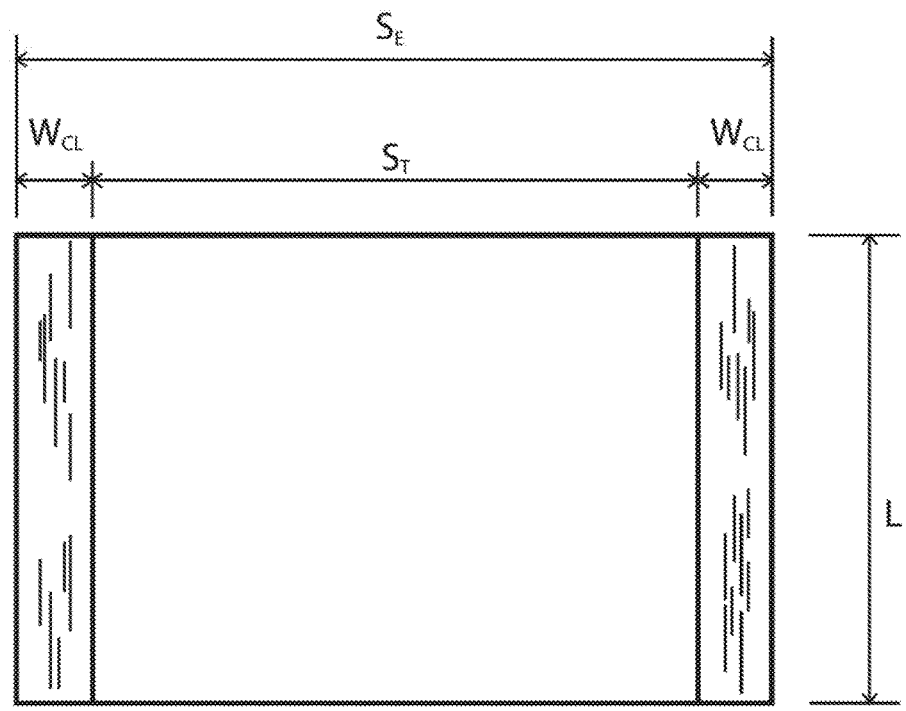
FIG. 3A shows a planar rectangular sheet with dimensions consistent with the desired dimensions of a parabolic trough reflector.

FIG. 3A shows a rectangular sheet with one linear dimension equal to L and one linear dimension equal to the extended parabolic arc length, $S_E$, which includes the clamping widths $W_{CL}$ at each supported edge of the sheet, and $S_T$, the free-hanging portion of the sheet between the clamping mechanisms on the support fixtures.

Figure 3B:
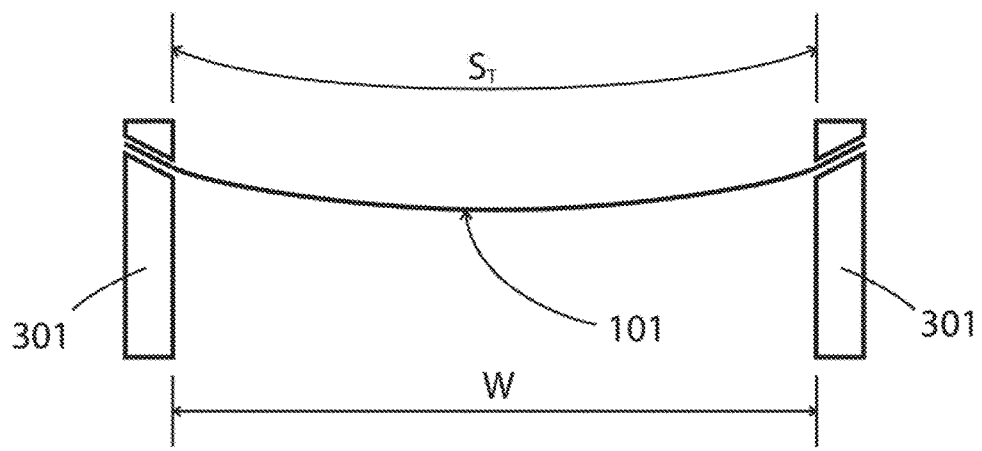
FIG. 3B shows the end view of a parabolic trough reflector, the spacing of the reflector support elements, and the curved and linear dimensions of the reflector.

FIG. 3B shows the end view of a sheet suspended between two support trusses 301. The horizontal distance between support trusses 301 is equal to the system-specific value of the horizontal width, W, of parabolic trough reflector 101 which is formed from the rectangular sheet shown in FIG. 3A. W is also the straight line distance between support points on the edges of the reflector. The curved arc connecting the edge points has a length equal to $S_T$, the total arc length of the cross-sectional parabola connecting the edge points.

The second step in the process of providing a free-hanging parabolic trough reflector that can be used in a VATR system involves fabricating, positioning, and aligning support structure that is capable of critically supporting the free-hanging rectangular sheet at two of its edges. The support fixtures securing the sheet must have a horizontal spacing that is equal to W, the desired transverse width of the parabolic trough that is formed when the sheet is supported as a free-hanging element. Also, the support fixtures must hold the two longitudinal (supported) edges of the free-hanging sheet so they are parallel to each other and in the same horizontal plane. Finally, the support fixtures must hold the edges of the free-hanging sheet so that its edge slopes are equal to the edge slopes of a parabolic trough reflector with the desired system-specific values of W and F. When W and F are chosen for a parabolic trough reflector, the edge slopes are mathematically determined and have a value that is given by W/4F along one edge of the sheet and by -W/4F along the other edge of the sheet.

Figure 4:
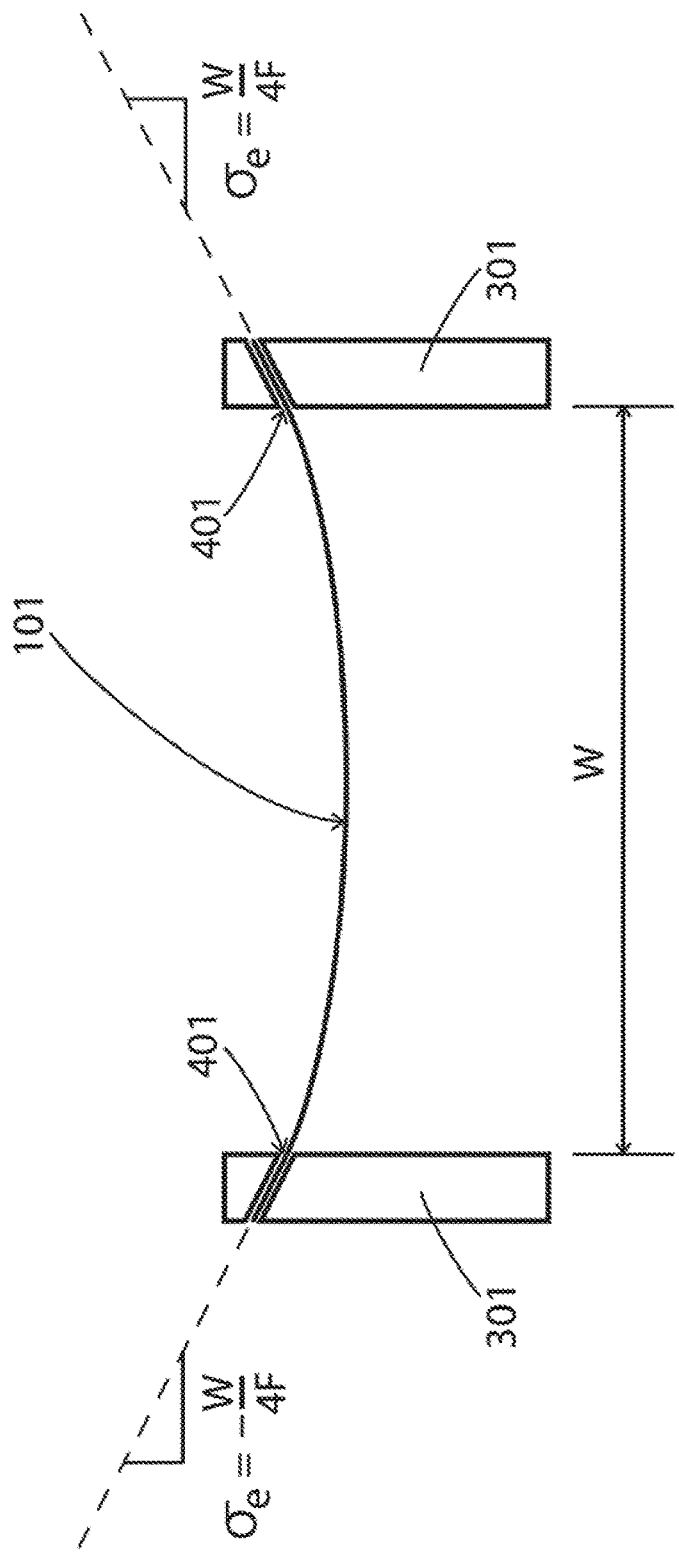
FIG. 4 shows parabolic trough reflector support structure which provides specific edge slopes for the reflector.

One embodiment of this support mechanism, shown in FIG. 4, forces a free-hanging sheet to have the required slopes at its edges in spite of the fact that the sheet has some degree of inflexibility. FIG. 4 shows an end view of two support trusses 301 which have clamping mechanisms 401 extending along their full length to support a parabolic trough reflector 101. The clamping mechanisms are fabricated so as to provide edge slopes, represented herein by the symbol $\sigma_e$, for parabolic trough reflector 101, where $\sigma_e$ is equal to W/4F along one edge of the sheet and -W/4F along the other edge of the sheet. Other attachment mechanisms for producing the desired edge slopes are obviously possible and are considered a part of this invention.

The third step in the process of providing a free-hanging parabolic trough reflector that can be used in a VATR system involves creating a precisely defined mass distribution for the sheet from which the reflector is formed, with the mass distribution being such that it provides uniform loading of the sheet when it is suspended as a free-hanging element. In this specification, the loading profile for a free-hanging sheet, at points along a transverse section of the sheet, is represented the by notation G(X). The transverse thickness profile of a free-hanging sheet is represented by the notation T(X). The specific weight (weight per unit volume) of the material from which the sheet is made is represented by the notation $\Gamma$. For a free-hanging sheet which has assumed the shape of a parabolic trough, G(X) is given by the following expression:

$$G(X) = (\Gamma)[S'(X)][T(X)].$$

The general mathematical formulation for converting geometrical properties of a free-hanging element into a loading profile for that element are given in "Applied Differential Equations" by Murray Spiegel, Prentice Hall, 1962, pages 105 to 108. Additional analysis has been conducted to develop the above expression for G(X).

As mentioned previously, uniform loading of a free-hanging sheet is required to provide and maintain an elastic deformation of the sheet which produces the shape of a parabolic trough. The condition of uniform loading must exist when the free-hanging sheet has assumed its parabolic shape. This is the key point of this discussion. The condition of uniform loading must occur simultaneously with the existence of the parabolic shape. A parabolic trough is the equilibrium shape of a free-hanging sheet or trough exposed to uniform loading. The mathematical derivation proving that a free-hanging flexible element has a parabolic shape while it has uniform loading is given in the reference provided in the previous paragraph, on the pages noted.

The condition of uniform loading for a free-hanging sheet is achieved when G(X) is a constant for all values of the coordinate variable X; that is, when the product of the three terms in the equation for G(X) is equal to a constant:

$$G(X) = [S'(X)][T(X)](\Gamma) = k_1$$

where $k_1$ is a constant. Since S'(X) is a function of X, G(X) can only be a constant if the function defining the thickness profile, T(X), is equal to a constant multiplied by the inverse of S'(X). This relationship may be written as follows:

$$T(X) = k_2[S'(X)]^{-1} = 2Fk_2(4F^2 + X^2)^{-1/2}$$

If the thickness of the sheet at X=0, the sheet's longitudinal centerline, is defined to be $T_0$, then it is seen that $k_2$ must be equal to $T_0$. The final expression for T(X) becomes:

$$T(X) = 2FT_0(4F^2 + X^2)^{-1/2}.$$

The above expression gives the transverse thickness profile, T(X) as an explicit function of the transverse coordinate variable X. This thickness profile provides uniform loading for the free-hanging sheet when it is elastically deformed into a parabolic trough. However, the sheet is not manufactured while it is in a free-hanging geometry. The required thickness profile must be incorporated into the sheet while it is disposed in a planar configuration. This means that the sheet cannot be fabricated with reference to distances and dimensions defined by values of the transverse coordinate variable X. It must be fabricated with respect to distances measured along the surface of the sheet, while the sheet is disposed in a planar configuration. Distances measured along the surface of the sheet correspond to distances measured along the curved arc of the parabolic trough which is formed when the sheet is supported as a free-hanging element. A transformation is required from the reflector coordinate X to a sheet coordinate that corresponds to the parabolic arc length, S(X). Unfortunately, the expression for S(X) given above involves a combination of algebraic and transcendental functions. For this reason, the inverse function required to accomplish the transformation from the coordinate variable X to the parabolic arc length variable S(X) cannot be written in closed form. The simplest way to accomplish the required coordinate transformation is to parametrically define the thickness profile—thickness versus distance—in two separate equations, one equation for sheet thickness and one equation for distance from the sheet's longitudinal centerline at which the sheet has the specified thickness. In terms of an arbitrary parameter "A" which takes on all values in the range $0 \leq A \leq W/2$, the appropriate parametric equations for T(A), the sheet thickness, and D(A), the distance from the sheet centerline at which the sheet has thickness T(A), are as follows:

$$T(A) = 2FT_0(4F^2 + A^2)^{-1/2}$$

$$D(A) = A(4F)^{-1}(4F^2 + A^2)^{1/2}(F)\log_e[A(2F)^{-1} + (2F)^{-1}(4F^2 + A^2)^{1/2}].$$

Figure 5:
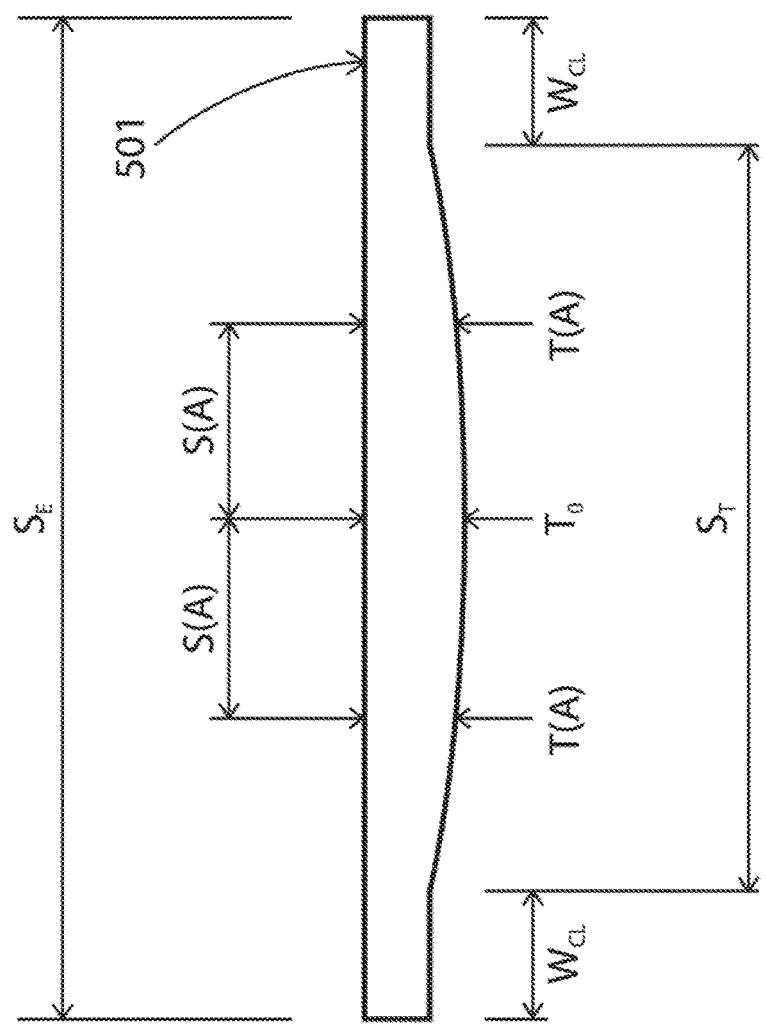
FIG. 5 shows a transverse section of a sheet with a continuously-varying transverse thickness profile.

The same value of A is used in calculating the thickness of the sheet, T(A), and the distance, D(A), between the centerline of the sheet and the location at which the sheet is to have the thickness value T(A). FIG. 5 shows schematically the end view of a sheet whose thickness profile is intended to provide uniform loading for the sheet when it is critically supported as a free-hanging element. The front reflective surface 501 of the sheet is flat, while the rear surface is very slightly convex in order to provide the required thickness profile. The sheet thickness is $T_0$ along the centerline of the sheet and the thickness T(A) is shown schematically at locations that are a distance D(A) from the sheet centerline. The overall transverse dimension of the sheet, $S_E$, is shown in relation to the clamping width, $W_{CL}$, and the free-hanging portion of the sheet, $S_T$. The thickness profile of the clamped portions of the sheet is irrelevant.

A sheet of metal, plastic, or other material can be processed as outlined in the previous paragraphs to produce a tapered transverse thickness profile that produces uniform loading for a free-hanging flexible sheet. This thickness profile causes the sheet to assume and maintain the shape of a parabolic trough when it is critically supported at its edges.

Another method of providing uniform loading for a free-hanging sheet involves applying a variable-thickness coating to a sheet of uniform thickness $T_0$. The coating, which could have a density different from the density of the original sheet, could be applied by controlled spraying, plating, or other means. The above equation for T(X) can be used to determine the transverse coating thickness profile, $T_C(X)$, which provides uniform loading for a critically supported free-hanging sheet. The resulting expression is:

$$T_C(X) = (\rho_S/\rho_C)(T_0/2)[(16F^2 + W^2)^{1/2}(4F^2 + X^2)^{-1/2} - 2].$$

where $\rho_S$ and $\rho_C$ are the densities of the sheet and the coating, respectively. As discussed above, the transverse profile of the coating thickness is best defined parametrically in two separate equations. Again using an arbitrary parameter "A" which takes on values in the range specified above, the equations for the coating thickness $T_C(A)$ is $$T_C(A) = (\rho_S/\rho_C)(T_0/2)[(16F^2 + W^2)^{1/2}(4F^2 + A^2)^{-1/2} - 2].$$

The equation for D(A), the distance from the sheet's longitudinal centerline to points at which the coating thickness is to have the value $T_C(A)$, is the same as above, with corresponding values of $T_C(A)$ and D(A) calculated by using the same value of A.

Another method of providing uniform loading of a thin sheet involves producing discrete, stepwise variations in the sheet's thickness profile, rather than the continuous variations discussed above. This method would be applicable to machining or molding operations, wherein longitudinal channels of appropriate width, depth, and separation would be cut, either into the back of a sheet of otherwise uniform thickness, or into the base of a mold which shapes the back of a sheet of otherwise uniform thickness. This discrete loading is effective because a real sheet made of slightly inflexible material responds to discrete loading by undergoing spatially continuous, non-discrete plastic deformation which closely approximates the sheet's response to a spatially continuous uniform loading. Uniform loading could also be achieved by applying a coating with discrete, stepwise thickness variations across the back of the sheet. The width, thickness, and spacing of the individual coated areas could be chosen so as to provide any desired degree of finesse as an approximation of the uniform loading provided by the continuous thickness variations that were discussed above. FIG. 6 shows schematically the end view of a sheet with molded or machined longitudinal grooves 601 that provide a discrete, stepwise loading of a sheet of otherwise uniform thickness, $T_0$. The sheet's highly-reflective surface, 501, is on the face opposite the grooved surface. The clamped portion of the sheet, defined by the width $W_{CL}$, has no grooves. The overall width of the sheet, $S_E$, and the free-hanging portion of the sheet, $S_T$, are shown for reference purposes.

The previous discussions have dealt with methods for providing uniform loading for free-hanging sheets that have no penetrations (holes) that would affect the distribution of the gravitational forces acting on the sheets. However, for the systems discussed herein, it is likely that there will be drainage holes for eliminating rain water or cleaning fluids from the reflector surfaces. These holes will be cut at locations along the longitudinal centerline of the reflecting sheets, that is, along the vertex line of the parabolic trough reflectors formed from the sheets. This invention reveals a method for eliminating the effect that drainage holes would have on the overall mass distribution and loading of the sheet. The method involves placing a protective circumferential lip around the periphery of each hole, with the mass of the protective lip being equal to the mass of material removed from the sheet by creating the hole. This protective lip has the dual purpose of (1) mechanically strengthening the circumferential edge of the hole and (2) maintaining the loading of the sheet which would exist if the hole were not present.

In summary, a process is revealed in this specification for designing and fabricating rectangular sheets that can be used as parabolic trough reflectors in VATR systems. The process involves three steps. The individual steps comprising the process are intended to be used together to provide flexible rectangular sheets that will be uniformly loaded when they are supported as free-hanging elements. The first step in the process involves fabricating flexible sheets whose linear dimensions are consistent with parabolic trough reflectors having predetermined system-specific values for longitudinal length, L, transverse width, W, focal length, F, and for clamping widths, $W_{CL}$. The second step in the process involves providing support structure for the flexible sheets which will clamp or otherwise hold and support the sheets so that their edge slopes are equal to the edge slopes of parabolic trough reflectors with predetermined system-specific values of W and F. The third step in the process involves providing a transverse mass distribution profile for the flexible sheets which will produce uniform loading of the sheets when they are critically supported at their edges. Multiple techniques, including thickness tapering, variable thickness coatings, and discrete, stepwise thickness variations are revealed for providing the required mass distribution.

What is claimed is:

1. A parabolic trough reflector assembly comprising
  a) a flexible sheet having a mass distribution that provides uniform loading for said sheet when it is critically supported as a free-hanging element, and with said sheet having longitudinal and transverse dimensions that are compatible with forming, through the process of critically supporting said sheet as a free-hanging element, a free-hanging parabolic trough reflector characterized by
     i) a highly reflective concave surface whose transverse sections are, at every longitudinal location, identical parabolas, and
     ii) a predetermined system-specific value of longitudinal length, L, with said longitudinal length being the distance measured horizontally between the two unsupported edges of said free-hanging parabolic trough reflector, and
     iii) a predetermined system-specific value of transverse width, W, with said transverse width being the distance measured horizontally between the two supported edges of said free-hanging parabolic trough reflector, and
     iv) a predetermined system-specific value of focal length, F;
  b) support fixtures which secure, hold, and critically support two opposing longitudinal edges of said sheet, with said support fixtures establishing and maintaining the relative orientation and position of the two supported edges of said sheet so that said supported edges are parallel to each other and in the same horizontal plane, and with said support fixtures having a horizontal spacing that is equal to W, the predetermined system-specific value of transverse width of said parabolic trough reflector that is formed by critically supporting said sheet as a free-hanging element, and with said support fixtures holding and securing the two supported edges of said sheet in such a manner that the edge slope at one supported edge of said sheet has a value of +W/4F and the edge slope at the other supported edge of said sheet has a value of −W/4F, where W and F, respectively, are the predetermined system-specific values of transverse width and focal length of said parabolic trough reflector.

2. The assembly of claim 1 with said sheet having a longitudinal dimension that is equal in length to the predetermined system-specific value of longitudinal length, L, of said parabolic trough reflector that is formed when said sheet is critically supported as a free-hanging element; and with said sheet having a transverse dimension that is equal in length to the extended parabolic arc length, $S_E$, of said parabolic trough reflector that is formed when said sheet is critically supported as a free-hanging element; and with said parabolic trough reflector having a predetermined system-specific value of clamping width, $W_{CL}$, transverse width, W, and focal length, F, which together define the value of said extended parabolic arc length, $S_E$, through the relationship $$S_E = 2W_{CL} + S_T,$$

where $S_T$, the total parabolic arc length of said parabolic trough reflector is defined by the relationship $$S_T = (W/8F)(16F^2+W^2)^{1/2} + (2F)\log_e[(W/4F)+(1/4F)(16F^2+W^2)^{1/2}].$$

3. The assembly of claim 2, wherein uniform loading is provided for said sheet when it is critically supported as a free-hanging element, with said uniform loading provided for said sheet by tapering its thickness from a maximum value $T_0$ along its longitudinal centerline to a lesser value at its supported edges; with the transverse thickness profile of said sheet being the same for all transverse sections of said sheet; and with the transverse thickness profile of said sheet defined parametrically in terms of a parameter "A" which takes on all values in the range 0≤A≤W/2; and with T(A), the thickness of said sheet, defined as $$T(A)=2FT_0(4F^2+A^2)^{-1/2};$$

and with D(A), the distance between the longitudinal centerline of said sheet and points at which said sheet has thickness T(A) being defined as $$D(A)=A(4F)^{-1}(4F^2+A^2)^{1/2}+(F)\log_e[A(2F)^{-1}+(2F)^{-1}(4F^2+A^2)^{1/2}],$$

with the same value of A used in calculating thickness values, T(A), and corresponding distance values, D(A), between the longitudinal centerline of said sheet and points at which said sheet has thickness T(A); and with the thickness of said sheet, T(A), therefore being the same at all points that are a distance D(A) from the longitudinal centerline of said sheet.

4. The assembly of claim 2, wherein uniform loading is provided for said sheet when it is critically supported as a free-hanging element, and with said uniform loading being provided to said sheet by applying a variable thickness coating to said sheet; with said sheet having initially uniform thickness, $T_0$, and uniform density, $\rho_{SH}$; and with said coating having a uniform density, $\rho_C$; and with said coating having a transverse thickness profile $T_C(A)$ that is the same for all transverse sections of said sheet; and with said transverse thickness profile $T_C(A)$ of said coating defined parametrically in terms of a parameter "A" which takes on all values in the range 0≤A≤W/2; and with said thickness profile $T_C(A)$ of said coating defined as $$T_C(A)=(\rho_{SH}/\rho_C)(T_0/2)[(16F^2+W^2)^{1/2}(4F^2+A^2)^{-1/2}-2];$$

and with D(A), the distance from the centerline of said sheet to points at which said coating has thickness $T_C(A)$, being defined as $$D(A)=A(4F)^{-1}(4F^2+A^2)^{1/2}+(F)\log_e[A(2F)^{-1}+(2F)^{-1}(4F^2+A^2)^{1/2}];$$

with the same value of A used in calculating said thickness values, $T_C(A)$, and corresponding values of said distance, D(A), from the centerline of said sheet to points at which said coating has thickness $T_C(A)$; and with the thickness of said coating, $T_C(A)$, therefor being the same at all points that are a distance D(A) from the longitudinal centerline of said sheet.

5. The assembly of claim 2, wherein discontinuous loading is provided for said free-hanging sheet by creating discrete, stepwise variations in said sheet's thickness; with said discrete, stepwise thickness variations produced by machining or molding longitudinal channels into the back surface of said sheet; and with the width, depth, and spacing of said channels providing thickness variations which, when averaged from channel to channel, approximate a continuous transverse thickness profile which would provide uniform loading for said sheet.

6. The assembly of claim 2, wherein discontinuous loading is provided for said free-hanging sheet by creating discrete, stepwise variations in the sheet's thickness, with the discrete, stepwise thickness variations produced by applying a coating to longitudinal strips along the back surface of said sheet, and with the width, thickness, and spacing of said coated strips providing thickness variations which, when averaged from strip to strip, approximate the continuous transverse thickness profile which would provide uniform loading for said sheet.

7. The assembly of claim 1, wherein said free-hanging sheet has circular drainage holes disposed along its longitudinal centerline, with the edges of said drainage holes reinforced by circumferential lips, with said circumferential lips having a mass equal to the mass of material removed from the said sheet in creating said drainage holes, thus preserving the loading of said sheet that would exist if said drainage holes did not exist.

* * * * *